(12) United States Patent
Gohr et al.

(10) Patent No.: US 6,492,485 B1
(45) Date of Patent: *Dec. 10, 2002

(54) REDISTRIBUTED POLYCARBONATE RESIN

(75) Inventors: Eric Thomas Gohr, Evansville, IN (US); Chad David Mistele, Mt. Vernon, IN (US); Michael F. Shannon, Mt. Vernon, IN (US); Vijaykumar Hanagandi, Evansville, IN (US); Devesh Mathur, Troy, NY (US); Patrick Joseph McCloskey, Watervliet, NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 32 days.

(21) Appl. No.: 09/547,372

(22) Filed: Apr. 11, 2000

(51) Int. Cl.[7] .............................................. C08G 64/00
(52) U.S. Cl. ..................... 528/196; 264/176.1; 528/198
(58) Field of Search .................. 528/196, 198; 264/176.1

(56) References Cited

U.S. PATENT DOCUMENTS

| | | | |
|---|---|---|---|
| 3,153,008 A | 10/1964 | Fox .............. | 528/176 |
| 3,161,615 A | 12/1964 | Goldberg ............ | 528/196 |
| 3,220,973 A | 11/1965 | Goldberg ............ | 528/196 |
| 3,312,660 A | 4/1967 | Kurkjy et al. .......... | 528/176 |
| 3,313,777 A | 4/1967 | Elam et al. ........... | 528/176 |
| 3,541,049 A | 11/1970 | Cleveland ............ | 528/196 |
| 3,666,614 A | 5/1972 | Snedeker et al. ....... | 524/154 |
| 3,799,953 A | 3/1974 | Freitag et al. ........ | 528/176 |
| 4,185,009 A | 1/1980 | Idel et al. ............. | 528/196 |
| 4,310,656 A | 1/1982 | Brunelle ............... | 528/200 |
| 4,383,092 A | 5/1983 | Ko et al. .............. | 526/62 |
| 4,431,793 A | 2/1984 | Rosenquist ........... | 528/198 |
| 4,469,861 A | 9/1984 | Mark et al. ........... | 528/196 |
| 4,727,134 A | 2/1988 | Brunelle et al. ....... | 528/371 |
| 5,021,521 A | 6/1991 | Krabbenhoft et al. .... | 525/462 |
| 5,026,817 A | 6/1991 | Sakashita et al. ...... | 528/199 |
| 5,097,008 A | 3/1992 | Krabbenhoft et al. .... | 528/371 |
| 5,142,018 A | 8/1992 | Sakashita et al. ...... | 528/199 |
| 5,319,066 A | 6/1994 | King, Jr. ............. | 528/199 |
| 5,364,895 A | 11/1994 | Stevenson et al. ...... | 524/120 |
| 5,412,061 A | 5/1995 | King, Jr. et al. ...... | 528/198 |
| 5,414,057 A | 5/1995 | Campbel et al.. ....... | 525/462 |
| 5,459,226 A | 10/1995 | King, Jr. et al. ...... | 528/196 |
| 5,521,275 A | 5/1996 | McCloskey et al. ..... | 528/487 |
| 5,567,802 A | 10/1996 | McCloskey et al. | |
| 5,650,470 A | 7/1997 | McCloskey et al. ..... | 525/462 |
| 5,652,312 A | 7/1997 | Phelps et al. ......... | 525/462 |
| 5,886,073 A | 5/1999 | McCloskey et al. ..... | 524/154 |

OTHER PUBLICATIONS

U.S. application Ser. No. 09/281,498, Docket No. RD–26495.
U.S. application Ser. No. 09/287,497, Docket No. RD–26999.

Primary Examiner—Terressa M. Boykin (57) ABSTRACT

The application relates to methods for producing a polycarbonate resin having a narrowed molecular weight distribution, specifically, the application relates to the use of a redistribution catalyst and a feedback loop control mechanism to prepare narrow molecular weight distribution resin.

69 Claims, 5 Drawing Sheets

PROCESS DATA
USL         12.400
TARGET
LSL         10.900
MEAN        11.545
SAMPLE N    12
StDev (ST)  0.238525
StDev (LT)  0.232391

POTENTIAL (ST) CAPABILITY
Cp     1.05
CPU    1.19
CPL    0.90
Cpk    0.90
Cpm

OVERALL (LT) CAPABILITY
Pp     1.08
PPU    1.23
PPL    0.93
Ppk    0.93

CONTROL

| OBSERVED PERFORMANCE | | EXPECTED ST PERFORMANCE | | EXPECTED LT PERFORMANCE | |
|---|---|---|---|---|---|
| PPM < LSL | 0.00 | PPM < LSL | 3424.32 | PPM < LSL | 2755.92 |
| PPM > USL | 0.00 | PPM > USL | 168.85 | PPM > USL | 117.01 |
| PPM TOTAL | 0.00 | PPM TOTAL | 3593.17 | PPM TOTAL | 2872.94 |

PROCESS DATA
USL         14.6500
TARGET
LSL         13.3500
MEAN        14.0168
SAMPLE N    163
StDev (ST)  0.067088
StDev (LT)  0.108345

POTENTIAL (ST) CAPABILITY
Cp     3.23
CPU    3.15
CPL    3.31
Cpk    3.15
Cpm

OVERALL (LT) CAPABILITY
Pp     2.00
PPU    1.95
PPL    2.05
Ppk    1.95

RUN 1

| OBSERVED PERFORMANCE | | EXPECTED ST PERFORMANCE | | EXPECTED LT PERFORMANCE | |
|---|---|---|---|---|---|
| PPM < LSL | 0.00 | PPM < LSL | 0.00 | PPM < LSL | 0.00 |
| PPM > USL | 0.00 | PPM > USL | 0.00 | PPM > USL | 0.00 |
| PPM TOTAL | 0.00 | PPM TOTAL | 0.00 | PPM TOTAL | 0.00 |

REDISTRIBUTED POLYCARBONATE RESIN

FIELD OF THE INVENTION

Polycarbonates are a particularly useful class of polymers because they have exceptionally high impact resistance and ductility. Also, polycarbonates can be made with high optical clarity. Some common uses of polycarbonates include transparent window glazing and optical media applications (e.g., the CD, DVD, CD-RW and other formats).

The present invention relates to particular polycarbonates, efficient processes for manufacturing and distributing polycarbonates, articles made from polycarbonates, and methods for making polycarbonate articles.

BACKGROUND OF THE INVENTION

Polycarbonates are desirable materials for a wide variety of end use applications including window glazing, optical media, automotive parts, building materials, packaging, and many others. Each of these end use applications has slightly different requirements, and it is desirable to customize the properties of polycarbonates to match the differing demands of particular end use applications. For example, it is desirable to use polycarbonate having a relatively low melt flow index (i.e., high viscosity) to make polycarbonate sheet for glazing applications because polycarbonate sheet is most economically produced by extrusion operations which are not compatible with low viscosity materials. In contrast, it is better to use high melt flow index (i.e., low viscosity) polycarbonate to make complicated parts by injection molding because it is easier to ensure that a lower viscosity material will completely fill a mold cavity having a complicated shape with small openings.

To meet requirements of diverse applications, manufacturers have typically run alternating manufacturing "campaigns" of polycarbonate resins. Specifically, manufacturers typically produce a large selection of polycarbonates having differing melt flow indices by varying polymerization conditions (e.g., time, temperature, etc.) to produce materials having differing average molecular weights. This process is expensive because it requires delay when switching between melt flow index (hereinafter "MFI") set points, and in continuous processes produces large quantities of off-specification material during the switch. There has long been a desire to eliminate this costly switching step while maintaining the flexibility to deliver a variety of customized polycarbonate grades.

It is known that certain "redistribution catalysts" may be used to promote chemical reactions which cut apart polycarbonate molecules. Examples of suitable redistribution catalysts are described, for example, in U.S. Pat. Nos. 5,567,802, 5,886,073, 5,459,226, and 5,141,057. These catalysts offer the ability to reduce the average molecular weight of polycarbonate, thereby raising the average MFI of the polycarbonate. However, certain of these catalysts may be too active to allow fine control of MFI. Also, the mere addition of a fixed amount of a redistribution catalyst to a source stream of polycarbonate would not necessarily make the MFI more homogenous throughout a large campaign because prior to addition of the catalyst, the stream of polycarbonate may have substantial MFI variation.

Further difficulties in manufacturing commercially useful polycarbonate products are encountered when attempting to produce large quantities of polycarbonate having both a consistent average MFI and a narrow distribution of MFI. In conventional manufacturing operations, large quantities of polycarbonate may be blended to obtain a homogeneous batch where the average MFI does not vary greatly. However, this technique is cumbersome, expensive and may still result in a product having a wide distribution of MFI. This wide MFI distribution is undesirable because it produces variability which causes problems with long term consistency when processing the resin into finished articles. For example, resins with wide MFI distributions are more likely to cause errors when injection molding because the plasticizing time of the resin is less predictable. Also, the peak injection pressure variability in injection molding operations may be higher than expected for such resins. Alternatively, the manufacturer may simply ship polycarbonate having a wider specification. This solution is also undesirable because drift of the mean MFI within a wide specification may require constant readjustment of injection molding and other fabrication operations. The assignee of the present application has endeavored to make higher quality polycarbonate by reducing MFI variability in its commercial polycarbonate products, allowing more precise tuning and less adjustment of molding parameters.

SUMMARY OF THE INVENTION

The present invention provides a method for producing a redistributed resin having a narrowed molecular weight distribution. According to this method, a source polycarbonate resin is fed into an extruder together with a redistribution catalyst for said resin, and a feedback loop control mechanism is used to adjust a result effective parameter (i.e., a parameter that will effect the MFI of the redistributed resin). Typical result effective parameters include the feeding rate of a redistribution catalyst, the temperature of the extruder, the operation speed of the extruder, the feeding rate of a co-reactant, the feeding rate of a quenching agent, the feeding ratio of the redistribution catalyst and combinations thereof.

The present invention also provides a method for producing a redistributed thermoplastic resin which comprises feeding a resin and a redistribution catalyst for said resin into an extruder, measuring the current melt temperature, comparing the melt temperature with a set point melt temperature to determine a temperature differential, and adjusting a result effective parameter in response to the temperature differential. It is further possible to instead measure the viscosity, compare the viscosity with a set point viscosity to determine a viscosity differential, and adjust the result effective parameter in response to said viscosity differential. It is also possible to measure both the temperature and viscosity, and to set the set point temperature or the set point viscosity based on the viscosity differential or the temperature differential, respectively.

In another aspect, the invention relates to a redistributed polycarbonate resin produced by the process described herein.

In yet another aspect, the invention relates to an improved method for injection molding which comprises injection molding a redistributed polycarbonate resin produced by the process described herein.

The present invention further relates to optical media, such as CD's, DVD's, CD-RW's and future commercial formats which comprise a redistributed polycarbonate resin produced by the process described herein.

The invention further relates to a method for producing a redistributed resin having a narrowed MFI distribution, which method comprises extruding a polycarbonate source resin together with a redistribution catalyst for said resin while using a feedback loop control mechanism to adjust addition of said redistribution catalyst.

In another aspect, the invention relates to a method for minimizing the amount of off-specification polycarbonate produced by a polycarbonate plant. According to this method, a master grade of polycarbonate is produced at a manufacturing facility. The master grade is then transported to a redistribution facility which may or may not be in a different geographic location. At the redistribution facility, the master grade is extruded together with a redistribution catalyst.

DETAILED DESCRIPTION OF THE INVENTION

Before a detailed description is provided of some embodiments of the invention, it is to be understood that this invention is defined only by the claims appended hereto, and it is not limited to the specific particular embodiments described in this section, which may be varied by the skilled artisan.

In this specification and in the claims, which follow, reference will be made to a number of terms which shall be defined to have the following meaning.

The singular forms "a", "an" and "the" include plural referents unless the context clearly dictates otherwise.

The term "polycarbonate" or polycarbonates" includes all copolycarbonates, homopolycarbonates and (co) polyestercarbonates.

The term "redistributed polycarbonate" defines a polycarbonate which has been exposed to a catalyst to promote a reaction which cleaves the polycarbonate molecules.

The term "MFI" refers to the melt flow index of a particular polymer sample. Except where otherwise indicated, the MFI of samples referred to in this specification was determined by online rheometry using a rheometer calibrated according to the procedure described in ASTM Standard D1238. The measurement conditions used for this method were 250° C. and 1.2 kg. MFI distribution histograms were plotted by taking a collection of on-line rheometry measurements as shown, for example, in FIG. 3.

The term "narrowed MFI distribution" refers to a polycarbonate which yields a smaller standard deviation when its MFI distribution is analyzed by the procedure described above. When measured over a sufficient time period, redistributed resins typically have a narrowed MFI distribution in comparison with the source polycarbonate resin. For purposes of this application, the MFI distributions were measured under conditions sufficient to capture long term variation in the process. Typically, the MFI is measured over equal time space intervals during a period of greater than 2 hours, preferably greater than 4 hours, more preferably greater than 8 hours, and most preferably greater than 2 days.

The "standard deviation of MFI was calculated from the MFI histograms described above using known mathematical methods. Sufficient data should be collected such that the standard deviation calculation is statistically proper. Typically, 15 or more samples should be collected.

The term "source polycarbonate resin" refers to finished polycarbonate resin which has not yet been exposed to a redistribution catalyst in an extruder. This polycarbonate resin may be in the form of a dry or wet powder or pellets or another form.

The term "redistributed catalyst" refers to a catalyst which promotes cleavage of polycarbonate molecules.

The term "activity ratio" refers to a measurement of catalyst activity defined as molecular weight unit shift per part per million (ppm) catalyst.

The term "feedback loop control mechanism" refers to an apparatus which actively measures a certain process variable or variables (e.g., temperature and viscosity) during an extrusion operation, and automatically adjusts a result effective parameter or parameters based on said measurement(s).

The term "quencher" refers to a chemical which may be added to a mixture of the resin and the redistribution catalyst which discourages or prevents the reaction promoted by the redistribution catalyst (typically by chemically altering the redistribution catalyst). A quencher may also be used to neutralize active species formed by the redistribution reaction. For example, cleaved polycarbonate molecule "ends" formed during redistribution may themselves be active species which can be neutralized by a quencher.

The term "feeding . . . together" in the context of adding a source resin and a redistribution catalyst into an extruder refers to any feeding mechanism where the catalyst and the source resin are mixed within the extruder. For example, systems where the resin and catalyst are premixed, and systems where the resin and catalyst are added into the extruder at different feeding points are both intended to be described by this language.

Throughout this application, where patents are referenced, the disclosures of these patents are hereby incorporated by reference into this application.

There is described herein a method for making redistributed polycarbonate resin by introducing a source polycarbonate resin and a redistribution catalyst for said resin into an extruder equipped with a feedback loop control mechanism. Described below are methods for making the source polycarbonate resin, suitable redistribution catalysts, preferred additives, quenchers and the feedback loop control mechanism. Also described below are redistributed polycarbonate resins, optical media incorporating said resins and methods for more efficiently manufacturing and distributing polycarbonate resins.

Source polycarbonate resins may be manufactured according to several methods which are well known in the art. Polycarbonates made by any method are suitable for use as source resins in the present invention. At present, there are two industrially useful methods for making polycarbonates: the interfacial method and the melt process. In the interfacial method, polycarbonate is typically prepared by mixing together water, an organic solvent such as methylene chloride, a dihydric phenol (e.g., bisphenol-A), a carbonate precursor (e.g., phosgene), and other ingredients such as catalysts and caustic to adjust the pH. This process is described, for example, in U.S. Pat. Nos. 3,161,615; 3,220,973; 3,312,659; 3,312,660; 3,313,777; 3,666,614 and 3,393,672. In the melt process, a dihydric aromatic compound is reacted together with a diaryl carbonate in the presence of a catalyst under melt polymerization conditions. This process is described in U.S. Pat. Nos. 3,153,008; 4,310,656; 4,383,092; 5,026,817, 5,142,018; 5,319,066 and 5,412,061. It is also possible that polycarbonates made by processes which have not yet been industrially applied (e.g., the solid state synthesis method) would be useful in the present invention.

It is also very well known to make a large variety of copolycarbonates and blends incorporating polycarbonates.

Any linear or branched organic polycarbonate composition is an acceptable starting material for the redistribution process of this invention. Suitable organic polycarbonates include aromatic and aliphatic polycarbonates. Preferably, the initial polycarbonate composition is an aromatic polycarbonate.

Typically, the weight average molecular weight of the polycarbonate starting composition may range from values as low as 500 to values as high as 200,000, as measured by gel permeation chromatography using polycarbonate standard reference materials. Preferably, the weight average molecular weight of the polycarbonate starting composition ranges from about 5,000 to about 100,000, more preferably from about 25,000 to about 65,000, and most preferably from about 15,000 to about 30,000.

Linear aromatic polycarbonates can be obtained commercially, for example, from General Electric Company under the trademark "LEXAN" polycarbonate pellet grades OQ1020, 1030, 100, 105, 125, 135 and 145. Powdered polycarbonate is also commercially available. Alternatively, linear aromatic polycarbonates can be prepared by any of the usual procedures for making these materials, for example, by interfacial phosgenation of a dihydroxy aromatic compound or by interfacial polymerization of a mixture of aromatic oligomers, such as bischloroformates, monohydroxy monochloroformates, and/or bis-hydroxy-terminated polycarbonate oligomers.

Typical examples of dihydroxy aromatic compounds suitable for the preparation of linear aromatic polycarbonates useful as starting materials for the process of this invention are described in U.S. Pat. No. 4,727,134. Dihydroxy compounds disclosed therein include bisphenol A, as well as bis(4-hydroxyphenyl)methane, 1,1-bis(4hydroxyphenyl) cyclohexane, bis(4-hydroxyphenyl)diphenylmethane, 4,4'-dihydroxybiphenyl, 2,6-dihydroxynaphthalene, resorcinol, and 2,2-bis(3,5-dichloro-4-hydroxyphenyl)propane. Dihydroxy aromatic compounds of the bisphenol A type, and especially bisphenol A, are preferred for their particular suitability in preparing linear aromatic polycarbonate compositions useful for the process of this invention.

In the event that an aromatic polycarbonate copolymer rather than a homopolymer is desired to be redistributed according to the process of this invention, two or more different dihydroxy aromatic compounds may be employed in the preparation of the copolymer. Alternatively, a copolymer of a dihydroxy aromatic compound with a glycol, such as propylene glycol, or with a hydroxy or acid terminated polyester, or with a dibasic acid may be prepared and used in the redistribution process. Further, blends of aromatic polycarbonate homopolymer with any of the above-described copolymers may be employed as the initial organic polycarbonate composition in the process of this invention.

Carbonate precursors which can be reacted with the dihydroxy aromatic compound for production of the linear aromatic polycarbonates are well known and described for example in U.S. Pat. Nos. 4,469,861 and 4,431,793. Illustrative examples of such precursors include carbonyl halides, diaryl carbonate esters and haloformates. The carbonyl halides can be carbonyl chloride, carbonyl bromide and mixtures thereof. Typical of the diaryl carbonate esters which can be employed are diphenyl carbonate; di(halophenyl) carbonates, such as di(chlorophenyl) carbonate, di(bromophenyl) carbonate, di(trichlorophenyl) carbonate, and the like; as well as di(alkylphenyl) carbonates, such as di(tolyl) carbonate. Also suitable are di(naphthyl)carbonate, di(halonaphthyl) carbonates, phenyl alkylphenyl carbonates such as phenyl tolyl carbonate; halophenyl halonaphthyl carbonates such as chlorophenyl chloronaphthyl carbonate, and the like; and mixtures of any of the foregoing. The haloformates suitable for preparing linear aromatic polycarbonates include mono- and bischloroformates of dihydric phenols, such as the monochloroformate of bisphenol A and the bischloroformate of hydroquinone; as well as the bishaloformates of glycols, for example, bishaloformates of ethylene glycol, neopentyl glycol, or polyethylene glycol. While other carbonate precursors will be recognized by those skilled in the art, carbonyl chloride, also known as phosgene, is generally preferred.

In utilizing the interfacial polymerization process to prepare linear aromatic polycarbonates, the dihydroxy aromatic compound is dissolved in an alkaline metal salt solution, for example, aqueous sodium hydroxide, and thereafter a water-immiscible solvent, such as methylene chloride, dichloroethane or chlorobenzene, is added. After introducing the carbonate precursor, for example phosgene, at room temperature, the polycarbonate intermediates are then isolated directly from the organic phase by distilling off the solvent, precipitation in a nonsolvent, or steam precipitation.

The chain length of the polycarbonate product substrates and thus, the desired molecular weight, can be adjusted and regulated by adding a chain terminating agent or chain stopper to the reaction mixture. Suitable chain stoppers include monofunctional phenols, such as, unsubstituted phenol, m- and p-methylphenol, m- and p-ethylphenol, m- and p-propylphenol, m- and p-isopropylphenol, m-bromophenol, p-butylphenol, p-t-butylphenol and p-cumylphenol. The addition of this agent is usually made prior to the addition of the carbonate precursor, but can be made at any time up to the point of reaction wherein the degree of polymerization approaches that of a high polymer.

The quantity of chain terminating agent which can be added to prepare the linear aromatic polycarbonates is an amount effective to prepare substrates having a weight average molecular weight in the range preferably from about 5,000 to about 100,000. This amount will vary as a function of the mole percent of aromatic dihydroxy compound employed in the reaction. The target molecular weight should generally be higher than the desired molecular weight of the redistributed resin.

Linear polycarbonate compositions, which are employed as starting materials for the process of this invention, are preferably composed of structural units of the formula (I):

(I)

wherein at least about 60 percent of the total number of R groups are aromatic organic radicals and the balance thereof are aliphatic, alicyclic, or aromatic radicals. Preferably, R is an aromatic organic radical and more preferably a radical of the formula:

(II)

wherein each A1 and A2 is a monocyclic divalent aryl radical and Y is a bridging radical in which one or two carbon atoms separate A1 and A2. Such radicals frequently are derived from aryl dihydroxy compounds of the formula HO—A1—Y—A2—OH, such as those mentioned hereinbefore. For example, A1 and A2 generally represent unsubstituted phenylene and substituted derivatives thereof. The bridging radical Y is most often a hydrocarbon group and particularly, a saturated group such as methylene, cyclohexylidene, or isopropylidene.

A most preferred interfacial method for making source polycarbonate resins is described in U.S. patent application Ser. Nos. 09/281,497 and 09/281,498. This application describes an interfacial synthesis method wherein at least one dihydroxy compound, an inert organic solvent (e.g., methylene chloride), water, caustic (e.g., NaOH), a carbonyl halide (e.g., phosgene) and a catalyst are added to a vessel while maintaining the pH of the mixture between about 4 and about 12. Simultaneously, during the interval while between 0 and about 90% of the total carbonyl halide is added to the vessel, a reaction system is activated to produce monofunctional aromatic chloroformates. These chloroformates are introduced into the vessel during the aforementioned interval. This method is most advantageous because it minimizes the amount of diarylcarbonate impurities produced during the interfacial synthesis process. Essentially, the monofunctional aromatic chloroformates act as an end-capping agent. The monofunctional aromatic chloroformates may be made continuously by reacting, in a tubular reactor, an aqueous caustic solution, a carbonyl chloride, a monofunctional hydroxyaromatic compound and at least one inert organic solvent. This method is most preferred because it can produce a source resin having less than 200 ppm, and more preferably less than 100 ppm diarylcarbonate impurities. These impurities are undesirable because they can lead to error causing residues in repetitive injection molding operations.

The source polycarbonate resins used in the present invention must have an MFI lower than that of the target average MFI for the redistributed resin. However, it is preferred to use a source resin having an MFI within 25% of the target for the redistributed resin. Also, the target MFI for the redistributed resin must be sufficiently different from the MFI of the source resin such that redistribution will occur. In a preferred embodiment of the invention, the target mean MFI for the redistributed resin will be at least three, and more preferably at least five standard deviation units from the mean MFI of the source resin. The minimum differential between the target mean MFI and the source mean MFI will be dependent on the systems' performance.

Various redistribution catalysts for polycarbonate are described in U.S. Pat. Nos. 5,567,802; 5,650,470; 5,521,275; 5,414,057; 5,652,312; 5,459,226 and 5,880,073.

As mentioned previously herein, branched aromatic polycarbonates may also used as the starting composition to be redistributed in the process of this invention. Any of the commercially available branched aromatic polycarbonates may be used, such as those disclosed in U.S. Pat. Nos. 3,541,049; 3,799,953; 4,185,009; 4,469,861; and 4,431,793.

Commercially available branched polycarbonates are prepared in interfacial polymerization processes wherein a branching agent, such as a polyhydric phenol having more than two hydroxy groups in the molecule, is reacted with an aromatic dihydroxy compound and a carbonate precursor in the presence of a chain terminating or molecular weight controlling agent. Suitable polyhydric phenols are disclosed in the references cited above, and include, for example, 1,1,1-tris-(4-hydroxyphenyl)ethane (THPE), 1,3,5-tris-(4-hydroxyphenyl)benzene, 1,4-bis(4',4"-dihydroxytriphenylmethyl)benzene and the like. Other suitable branching agents include cyanuric chloride disclosed in U.S. Pat. No. 3,541,049; branched dihydric phenols, such as those disclosed in U.S. Pat. No. 4,469,861; 3,3-bis(4-hydroxyaryl)oxindoles disclosed in U.S. Pat. No. 4,185,009; and aromatic polycarbonates end-capped with branched alkyl acyl halide and/or acids, such as those disclosed in U.S. Pat No. 4,431,793.

The aromatic dihydroxy compounds, carbonate precursors, and chain terminating or molecular weight controlling agents recited previously hereinabove for use in the preparation of linear aromatic polycarbonates are also suitable for preparation of branched aromatic polycarbonates.

In accordance with the process of this invention, any of the above-identified polycarbonates having an initial weight average molecular weight typically in the range from about 5,000 to about 100,000 may be reformed into a final polycarbonate composition having a different molecular weight. Included are mixtures of different linear or branched polycarbonates and mixtures of linear and branched polycarbonates. The process is useful both for virgin polycarbonates and recycled polycarbonates, whether linear or branched, including polymers formulated into such products as optical disks (usually linear) and blow-molded bottles (usually branched).

The redistribution process involves melt equilibrating the starting composition in the presence of a carbonate redistribution catalyst. Melt equilibration involves heating the polymer at a temperature sufficient to produce a melt for a time sufficient to achieve redistribution equilibrium. Typically, when the starting material is a single homopolymer or copolymer, redistribution converts the starting polycarbonate into a redistributed polycarbonate having a weight average molecular weight which is lower than the starting weight. However, when the starting composition is a blend of homopolymers or copolymers of different molecular weights, it is possible for the redistributed composition to have a molecular weight higher than at least one starting component and lower than at least one other starting component.

It is noted that the redistribution process of this invention is not intended to incorporate into the starting materials branching agents. Examples of such branching agents are trimellitic anhydride acid chloride, cyanuric chloride and phenolic compounds such as 1,1,1-tris(4-hydroxyphenyl) ethane. Branching agents of this type will be recognized by those skilled in the art of polycarbonate synthesis and are described in U.S. Pat. Nos. 5,021,521 and 5,097,008. Such branching agents are known to equilibrate with linear aromatic polycarbonate compositions to form branched aromatic polycarbonate compositions.

Suitable carbonate redistribution catalysts include a wide variety of bases and Lewis acids. Illustrative examples include, amines, particularly 1,3-dimethylaminopropane, imidazole, benzimidazole, and benzotriazole, as well as other organic bases, for example tetraalkylammonium hydroxides, such as tetramethylammonium hydroxide, usually as the pentahydrate, diethyldimethylammonium hydroxide, and tetraethylammonium hydroxide; tetraalkylammonium phenoxides, such as tetramethylammonium phenoxide, usually as the monohydrate; tetraalkylammonium acetates, such as tetramethylammonium acetate; tetraalkylammonium tetraphenylborates, such as tetramethylammonium tetraphenylborate; as well as lithium stearate, the lithium salt of bisphenol A, the tetraethylammonium salt of bisphenol A, sodium phenoxide, and the like. Other suitable organic bases include phosphines, for example, triphenylphosphine. A wide variety of organometallics are suitable catalysts, including organotin compounds, such as di(n-butyl)tin oxide, di(n-octyl)tin oxide, di(n-butyl)tin dibutoxide, di(n-butyl)tin dioctoate, dibutyltin, tetrabutyltin, tributyltin trifluoroacetate, tributyltin chlorophenoxide, bis [(dibutyl)(phenoxy)tin] oxide, and tributyltin hydride; as well as organotitanium compounds, such as titanium tetra (isopropoxide), titanium tetra(5-methylheptoxide), and titanium tetra(butoxide); as well as, zirconium tetra (isopropoxide), aluminum tri(ethoxide), aluminum tri (phenoxide), mercuric acetate, lead acetate, (diphenyl) mercury, (tetraphenyl)lead, and (tetraphenyl)silane. Also suitable are a variety of hydrides, including sodium hydride, lithium hydride, aluminum hydride, boron trihydride, tantalum and niobium hydride, lithium aluminum hydride, lithium borohydride, sodium borohydride, tetramethylammonium borohydride, tetra(n-butylammonium) borohydride, lithium tri(t-butoxy) aluminum hydride, and diphenylsilane; as well as simple inorganics, such as lithium hydroxide, sodium silicate, sodium borate, silica, lithium fluoride, lithium chloride, lithium carbonate, and zinc oxide.

Preferred redistribution catalysts include tetraorganophosphonium hydroxides, tetraorganophosium carboxylates, tetraalkylammonium hydroxides, tetraalkylammonium acetates phosphites, organometallic compounds, and combinations thereof. The most preferred redistribution catalysts are those which in greater amounts, produce a lowered level of free monomer in the final product. Tetraorganophosphonium hydroxides are examples of such preferred catalysts. The most preferred redistribution catalysts are tetra-($C_{1-6}$ alkyl) phosphonium hydroxides, and in particular, tetrabutyl phosphonium hydroxide ("TBPH"). The amount of TBPH added should preferably be sufficient to produce a mixture having from 5 to 200 ppm TBPH. In a more preferred embodiment, the amount of TBPH should be 40–120 ppm, and optimally 40–80 ppm. Some times the amount of TBPH will be adjusted to fall in a less preferred range depending on the drift in the mean MFI for the source resin.

It is also desirable, in practicing the present invention, not to choose a redistribution catalyst which is too reactive for efficient control by the feedback mechanisms described below. Specifically, it is preferred to use a catalyst which has an activity ratio of less than 25 molecular weight units per ppm at catalyst wherein the activity ratio is determined over a range of catalyst addition ratios sufficient to produce a percentage molecular weight drop of between 0 to 25%. TBPH falls within this range, while ammonium hydroxide is too active. In a more preferred embodiment of the invention, the activity ratio is less than 10 molecular weight units per ppm of catalyst and the molecular weight drop is between 1 and 15%.

The amount of carbonate redistribution catalyst employed in the process of this invention may be any amount which is effective in promoting the redistribution process. Usually the effective amount will depend upon the particular catalyst employed, the reaction rate desired, the particular molecular weight desired in the redistributed composition, and to a lesser extent on the chemical nature of the particular starting polycarbonate composition. Also, the effective amount may vary based upon the particular equipment used. The operator will have to try different settings to find optimal settings for each piece of equipment.

Optionally, a diarylcarbonate may be added to the starting polycarbonate composition to be redistributed. The diaryl carbonate functions to control molecular weight and serves as an efficient endcapping agent. Diaryl carbonates which are suitable include diphenyl carbonate and substituted diphenyl carbonates provided that the substituent is inert with respect to the redistribution process. Typical inert substituents include alkyl, halo, cyano, alkoxy, carboxy, aryl and nitro moieties. Preferably, the diarylcarbonate is unsubstituted diphenyl carbonate. Unfortunately, adding diarylcarbonates is undesirable for polycarbonate applications where avoiding plate out is important (e.g., injection molding). If the polycarbonate is to be used for injection molding, the amount of diarylcarbonate must be kept sufficiently low such that the plate out phenomenon (i.e., deposits left on the mold after injection molding operations) is avoided to the extent necessary.

The amount of diaryl carbonate employed in the process of this invention may be any amount which provides the desired molecular weight in the redistributed polycarbonate composition. Usually, the amount of diaryl carbonate is no greater than about 1.5 weight percent based upon the amount of starting polycarbonate, more preferably, no greater than about 1.0 weight percent.

The redistribution process of this invention can be effected by dry mixing the starting organic polycarbonate, the carbonate redistribution catalyst, and optionally, the diaryl carbonate, and melt equilibrating the resulting mixture at a temperature ranging from about 180° C. to about 320° C. Preferably, the temperature ranges from about 250° C. to about 300° C. Typical melt processing techniques include melt condensation in a Helicone reactor for approximately 5 to 30 minutes, or continuous extrusion through a single screw or twin screw extrusion device. One skilled in the art will recognize that if extrusion is employed, the screw speed and feed rate may vary. During heating, it may be necessary to vent gases formed during decomposition of the carbonate redistribution catalyst.

Numerous additives may also be incorporated into the source polycarbonate and/or the redistributed polycarbonates described herein. Typically, the additives may be introduced into the extruder feed throat together with the source polycarbonate and the redistribution catalyst. It is desirable not to use additives which chemically interact with the redistribution catalyst, but some interaction may be tolerated if it is planned for and does not have unacceptable consequences. Additionally, it is possible to incorporate additives which interact with the redistribution catalyst by adding the quencher to the extruder at a point upstream of where said additive is introduced.

One of the most important additives is a mold release agent. The release agent ensures that the redistributed polycarbonate will easily separate from the mold upon injection molding.

Many release agents, such as high molecular weight aliphatic esters (e.g., pentaerythritol tetrastearate) yield acceptable performance, but the most preferred is glycerol monostearate (GMS). Sufficient GMS is preferably added into the extruder feed throat to produce a redistributed resin comprising GMS in an amount of 50–600 ppm, more preferably, 100–300 ppm, and optimally about 200 ppm. Fatty acid esters other than GMS may also yield acceptable performance.

Another important additive is the stabilizer. Many polycarbonate stabilizers, such as acidic, phosphorous-based compounds and hindered phenols, are well known in the art. However, phosphites are the most preferred class of stabilizers. One suitable, but less preferred phosphite is tris(2,4-di-tert-butylphenyl)pentaerythritol diphosphite. The most preferred stabilizer for use in redistributed polycarbonate is bis(2,4-dicumylphenyl)pentaerythritol diphosphite. Sufficient amounts of this diphosphite are preferably added into the extruder feed throat to produce a redistributed resin comprising from 50–400 ppm, more preferably 100–300 ppm, and optimally 200 ppm of the diphosphite.

Additional additives which may be added into the feed throat of the extruder include dyes, plasticizers, pigments, and anti-static agents which are known to be compatible with polycarbonates. Also, it is possible to add branching agents, such as 1,1,1-tris(4'-hydroxyphenyl)ethane (THPE) to produce a branched redistributed resin. It is most preferred to add branching agents after adding the quenching agent.

Quenching agents may be added near the output end of the extruder to ensure deactivation of the redistribution catalyst and/or neutralization of the redistributed polymer. During redistribution, the polymer will break up into shorter chain lengths having ends which are not "end-capped." Therefore, it may be desirable to add a quenching agent to ensure the ends which are not end-capped do not participate in any further chemical reactions. Typically, an aqueous acidic solution of quencher is used. Steam and quenching agent decomposition products are typically removed further downstream by devolatilization through a vent in the extruder.

Examples of some suitable quenching agents include phosphorous acid, phosphoric acid, toluene sulfonic acid and polyhydroxylaliphatic compounds (e.g., glycerol monostearate, pentaerythritol or ethylene glycol). The most preferred quenching agent is $H_3PO_3$. The skilled artisan may determine an optimal amount of quenching agent which is typically added in equimolar amount, or slight excess, with respect to the catalyst. In a preferred embodiment of the invention, the amount of $H_3PO_3$ quenching agent added is sufficient to produce a redistributed resin comprising 1–30 ppm, more preferably 3–7 ppm, and optimally 5 ppm quenching agent (calculated as though the quenching agent remains chemically inert upon addition, which it does not). During redistribution, the polymer itself will break up into shorter chains having ends which are not "end-capped." Therefore, it may be desirable to add a quenching agent to ensure the ends, which are not end-capped, do not participate in any further undesirable chemical reactions.

Standard extruder designs that are well known in the art can be utilized in the present invention. In addition to a feed throat, the extruder may optionally have at least one vacuum port through which gases formed during quenching of the redistribution catalyst can be vented. The extruder can be either a single screw or twin screw extruder. The extruder and screw may be made from corrosion-resistant materials or have corrosion-resistant surface coatings. One skilled in the art will recognize that the screw speed and feed rate may vary.

Various screw designs are well known by those skilled in the art. For vented extruders, the screw must be configured in such a way that a melt seal develops inside the extruder. A melt seal exists when the free volume within the extruder is sufficiently filled with molten resin so as to prevent the passage of gases between the section of the extruder in close proximity to the feed throat and the section of the extruder in close proximity to the vacuum port nearest to the feed throat. This melt seal must be located between the feed throat of the extruder and the vacuum port that is closest to the feed throat. The melt seal operates to prevent the pulling of air through the extruder by the force of the vacuum. Any screw design, whether single or double screw, that results in the proper placement of the melt seal within the extruder can be used to practice the method of the present invention. An appropriate screw design is easily determinable by those skilled in the art. Multiple vents and melt seals may be present.

Figure 1:
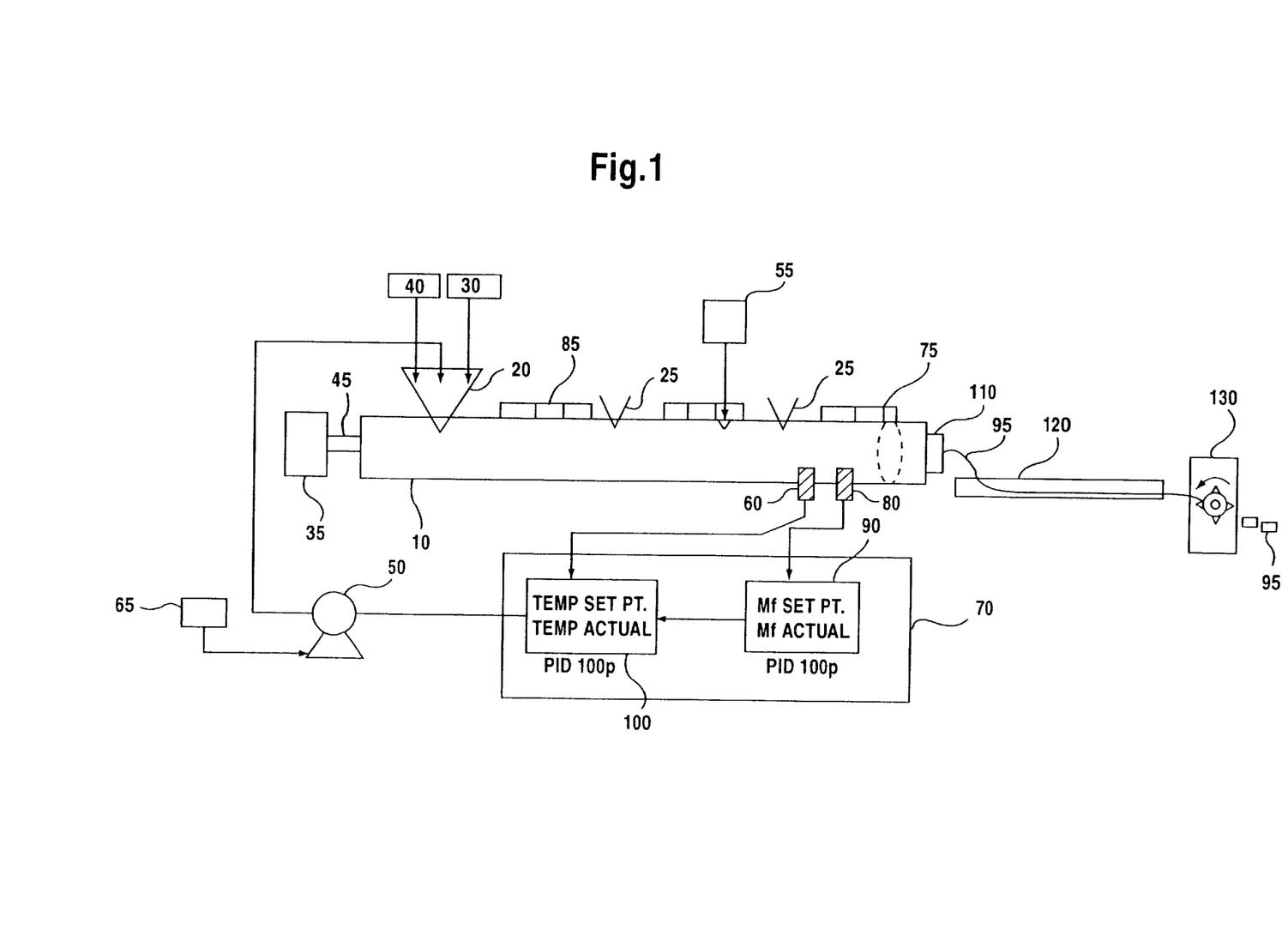
FIG. 1 is a diagrammatic representation of a preferred embodiment of an apparatus for producing a redistributed polycarbonate resin.

FIG. 1 depicts a typical extruder apparatus with a feedback loop control mechanism according to the present invention. This apparatus comprises a vented extruder (e.g., a Werner & Pfleiderer twin screw extruder) 10 having a feed throat 20 and two vents 25. An additives feed mechanism 30 feeds into the feed throat 20. A source resin feed mechanism 40 also feeds into the feed throat 20. Additionally, a catalyst pump 50 feeds into the feed throat 20.

The extruder 10 has an integrated temperature probe 60 to measure the temperature of the molten resin within the extruder 10. The temperature probe 60 is operatively connected to a control system 70 such as a Texas Instruments D3 distributive control system. The extruder also has an integrated rheometer 80 which outputs to the control system 70. The control system 70 is capable of controlling the speed of the catalyst pump 50, which supplies catalyst from a catalyst feed source 65. A die 110 is fastened to the output end of the extruder 10. Stands of polycarbonate typically exit the die 110, enter a water bath 120 and then are pelletized using a pelletizer 130.

In operation, the resin feed mechanism 40 and the additives feed mechanism 30 operate at constant rates calibrated to achieve the desired additives level in the redistributed resin. The screw or screws within the extruder 10 also operate at a constant speed. The desired MFI set point for the redistributed resin is entered into the control system 70. The control system 70 constantly compares the desired MFI with the MFI measured by the pre-calibrated rheometer 80. This function is typically accomplished by a first proportional integral and differentiation (PID) control loop 90, which is part of the control system 70. The first (PID) loop 90 outputs a signal proportional to the MFI differential to a second (PID) loop 100. The second PID loop adjusts the temperature set point based on this output signal. The second PID loop 100 also accepts an input signal from the temperature probe 60. The second PID loop then adjusts the speed of the catalyst pump 50 based on the differential between the measured temperature and the temperature set point. In this manner, the apparatus constantly adjusts processing conditions to achieve the desired MFI. The resin 95 typically is extruded through a die 110 into a water bath 120, and is pelletized using a pelletizer 130.

The extruder apparatus is operated by means of a motor 35, which drives a screw 45. The screw 45 is configured to create melt seal areas up stream of the vents 25. The apparatus also has a quencher injection mechanism 55, and a melt filter 75. The extruder typically is heated by a plurality of heating plates 85.

Figure 2:
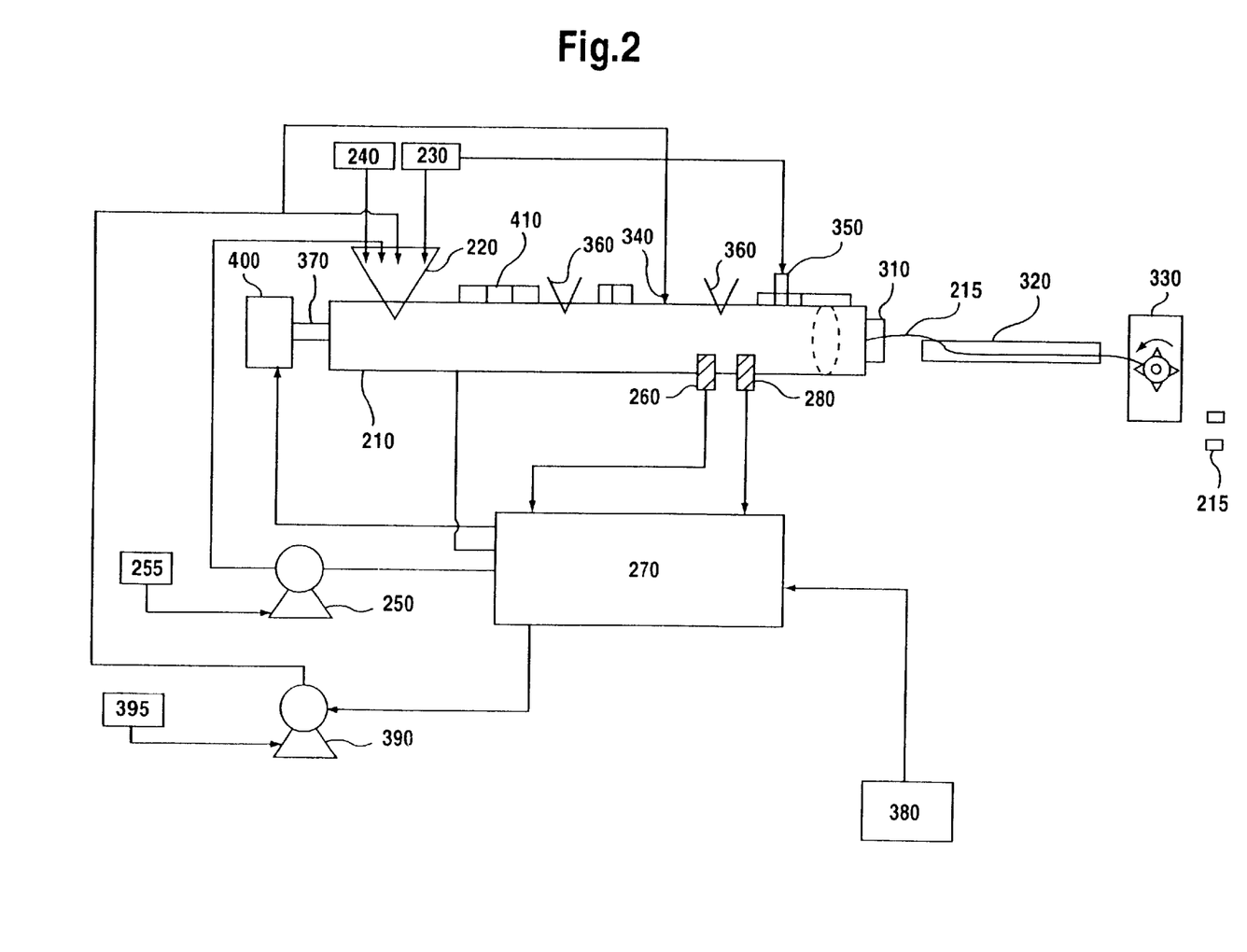
FIG. 2 is a diagrammatic representation of a complicated apparatus for producing a redistributed resin, which apparatus is capable of controlling numerous result effective parameters.

FIG. 2 depicts a prophetic example of a more complicated apparatus according to the present invention. This apparatus is capable of controlling numerous result effective parameters—it can adjust the MFI of the redistributed resin by numerous methods. The apparatus comprises a vented extruder 210 having a feed throat 220. An additives feed mechanism 230 feeds into the feed throat 220. A source resin feed mechanism 240 also feeds into the feed throat 220. Additionally, a catalyst pump 250 feeds catalyst from the catalyst source 255 into the feed throat 220.

The extruder 210 has an integrated temperature probe 260, and an integrated rheometer 280 to measure the temperature, and the viscosity, respectively, of the molten resin within the extruder 210. The temperature probe 260 is operatively connected to a control system 270. A die 310 is fastened to the output end of the extruder 210. Strands of polycarbonate 215 typically exit the die 310, enter a water bath 320, and are pelletized using a pelletizer 330.

The vented extruder 210 also has a port 340 for injecting a quenching agent. Additionally, the vented extruder 210 has an optional additive port 350 for injecting additives which could interfere with the redistribution reaction. The vented extruder 210 also has a vent 360 for devolatilization of water used as a carrying agent for the quencher and any catalyst decomposition products. A melt seal (not shown) should exist within the extruder 210 between the feed throat 220 and the vent 360. Screw 370 designs for creating melt seals are well known in the art.

In FIG. 2, for purposes of illustration, the control system 270 is connected to a variety of apparatus for controlling result effective parameters. While it is unlikely that one would choose to build an apparatus capable of controlling all of these parameters, this Figure is meant to be illustrative.

In FIG. 2, the control system 270 may receive a signal from a remote control system 380. The control system 270 is also operatively associated with a quencher pump 390 which may be controlled to feed quencher from a quencher source 395 into the extruder at different places. The control system 270 may also control the operation of the catalyst pump 250, the motor 400, the source resin feed mechanism 240, the additives feed mechanism 230 (this could be used, for example, if the additive quenched the catalyst), and sets of heating bands 410.

In operation, the apparatus shown in FIG. 2 would function similarly to the apparatus of FIG. 1 with several complications. First, the apparatus of FIG. 2 may input data from either the temperature probe 260, the rheometer 380 or both. Upon inputting data from a single instrument, the controller would compare this data with a set point, and output a control signal accordingly. Alternatively, the controller 270 accepting data from both the rheometer 280 and the temperature probe 260 could, as in FIG. 1, use the rheometer measurement differential to adjust the temperature set point, or it could use the temperature measurement differential to adjust the rheometer set point, but the former is preferred.

Based on signals received from the probes, the controller 270 could adjust the quencher pump to deliver a differing amount of quencher. The controller could also simply adjust the catalyst pump speed as in FIG. 1. Alternatively, the controller 270 could change the speed of screw 370 rotation by adjusting power applied to the motor 400. Further, the controller 270 could adjust the speed of the resin feed mechanism 240 or the additives feed mechanism 230. The controller 270 could also adjust the temperature within the extruder by adjusting the power applied to heating coils 410.

One typically has an initial set point for melt flow dictated by commercial requirements, but one may not have an initial temperature set point. The temperature set point may be determined by operating the extruder without using the feedback loop apparatus while measuring the resin temperature. The measured temperature may be used as the initial set point. After the apparatus (such as that shown in FIG. 1) is operated for some time, the temperature set point may change. When the extruder is restarted, it is advantageous to again use the changed set point to minimize time necessary to achieve stable operation.

The present invention may be further understood by reference to the following examples, but it should be understood that these examples are supplied for illustrative purposes only, and the claims should not be limited by these examples.

EXAMPLES

Example 1

Narrowing MFI Distribution of Polycarbonate Source Resin

A formulation screening experiment was performed on a production scale using the process according to the invention. The materials were extruded on a 92 mm Werner & Pfleiderer twin screw extruder equipped with loss in weight feeders to deliver the additives. The extruder ran between 3000 and 6000 lbs./hr at approximately 600 F.

An apparatus was construed and operated as shown in FIG. 1. The extruder was a 92 mm Werner & Pfleiderer twin screw extruder equipped with loss in weight feeders to deliver the additives. The source resin was prepared by the preferred interfacial process described herein, wherein monofunctional aromatic chloroformates are added during the 0 to about 90% internal of carbonyl halide addition. The source resin had an MFI as described in Table I, below, and a residual diaryl carbonate level of less than 200 ppm. Low diaryl carbonate polycarbonate resin can be formed, for example, by adding a dihydroxy compound, $MeCl_2$, $H_2O$, NaOH, phosgene and an interfacial polycarbonate synthesis catalyst to a vessel while maintaining the pH between about 4 and 12, and subsequently, within an interval of between 0 and 90% of the total phosgene addition, activating a system which produces monofunctional aromatic chloroformates (MAC), and introducing about 1 to 20 mole % of one MAC to the vessel within the interval of 0 to about 90% of the total phosgene addition.

Each of the runs listed below was preceded by a start-up period to achieve steady state extrusion conditions.

As described above, the temperature set point was continually adjusted during the process. The MFI set points are shown in Table I below. For each run, the extruder produced between 3000 and 6000 lbs./hr. at approximately 600° F.

TABLE I

|  | Run 1 | Run 2 | Run 3 | Run 4 | Run 5 | Control |
|---|---|---|---|---|---|---|
| Resin | 100 | 100 | 100 | 100 | 100 | 100 |
| Water (pph) | 0.8 | 0.8 | 0.8 | 0.8 | 0.8 | 0.8 |
| TBPH (pph) | 0.005 | 0.005 | 0.005 | 0.005 | 0.005 |  |
| $H_3PO_3$ (pph) | 0.0005 | 0.0005 | 0.0005 | 0.0005 | 0.0005 |  |
| Rel 1 (pph) | 0.27 | 0.05 | 0.05 |  | 0.27 |  |
| Stab 1 (pph) | 0.045 | 0.03 |  | 0.03 |  | 0.45 |
| Rel 2 (pph) |  |  |  | 0.02 | 0.02 |  |
| Stab 2 (pph) |  |  | 0.02 |  | 0.02 |  |
| Initial Resin MFI | 11 | 11 | 11 | 11 | 11 | 11.5 |
| Pellet MFI target | 14 | 14 | 14 | 14 | 14 | 11.5 |
| Actual MFI[+] | 14 | 13.7 | 14.4 | 14.4 | 13.8 | 11.5 |

Figure 3:
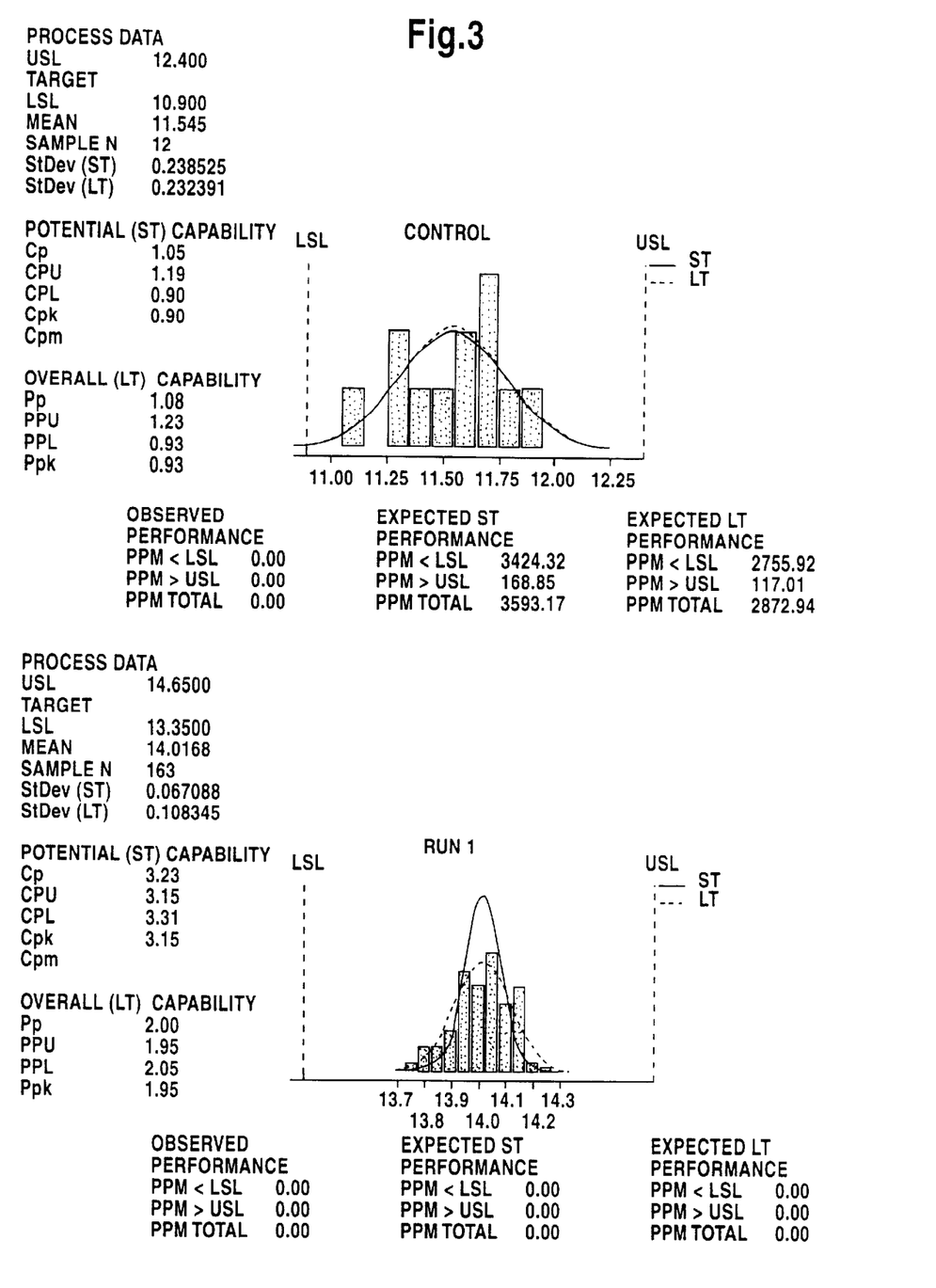
FIG. 3 is a comparative plot showing the MFI distribution of a control resin versus the MFI distribution of a redistributed resin. The data for both distribution plots was collected over one day.

Rel 1-Pentaerythritol tetrastearate, CAS [115–83-3]
Rel 2-Glycerol monostearate, CAS [97593-29-8]
Stab 1-tris(2,4-di-tert-butyl phenyl)phosphite, CAS [31570-04-4]
Stab 2-bis(2,4-dicumylphenyl)pentaerythritol diphosphite CAS [154862-43-8]
[+]-measured using bench-top rheometer FIG. 3 shows a comparison of the dispersion of MFI for the Control Experiment versus Run 1. This data was collected by simultaneously feeding a source resin into two different lines. The MFI of the source resin was measured using a commercial bench top instrument, while the MFI of the redistributed resin was measured using on-line rheometry. One can see from this data that the control experiment exhibits a much wider MFI dispersion.

Example 2
Narrowing MFI Distribution of Polycarbonate Source Resin

The apparatus described in Example 1 was again used to narrow the MFI distribution by converting a source resin to a redistributed resin.

The source resin had an average MFI of 12.3, with a standard deviation of 0.45. A comparative experiment was performed wherein the controller simply metered a constant amount of TBPH into the source resin, which was sufficient to increase the resin's MFI to 13. However, the standard deviation of MFI remained the same, at 0.45. Next, an experiment was performed wherein the feedback loop was put into operation. The feedback loop control mechanism produced an average MFI of 13, but it also substantially narrowed the standard deviation of MFI to 0.14.

For comparison purposes, the same experiment with operating feedback control was performed using diethyl dimethyl ammonium hydroxide as the catalyst. This catalyst is more active, and produced an average MFI of 12.1. However, this process also was less controllable, and produced a standard deviation of MFI of 0.24. The results of these experiments are summarized in Table II, below.

TABLE II

| Material | Average MFI | Standard Deviation of MFI |
| --- | --- | --- |
| Resin Feed | 12.3 | 0.45 |
| Open loop Control | 13 | 0.45 |
| Feedback controlled | 13 | 0.14 |
| Feedback controlled with ammonium Catalyst (HF resin) | 12.1 | 0.24 |

The feedback loop control mechanism experiments for both catalysts were then repeated several times for different catalyst loading levels. The residual bisphenol-A monomer levels were then determined by liquid chromatography. The results are shown in Table III, below.

TABLE II

| Catalyst | Loading (ppm) | Residual BPA (ppm) |
| --- | --- | --- |
| TBPH (5% aq) | 10 | 30 |
|  | 20 | 26 |
|  | 40 | 25 |
|  | 80 | 15 |
| DEDMAH (5% aq) | 10 | 15 |
|  | 20 | 20 |
|  | 40 | 25 |
|  | 80 | 50 |

TBPH = tetrabutyl phosphonium hydroxide
DEDMAH = diethyl dimethyl ammonium hydroxide Table III shows that increasing levels of the phosphonium catalyst lower the residual levels of BPA, which is desirable. In contrast, increasing levels of the ammonium catalyst raise the residual levels of BPA.

Example 3
Injection Molding Compact Disks Using Redistributed Polycarbonate Resin A study was performed to determine if more consistent mean MFI polycarbonate resin would provide a significant advantage in fabricating compact disks. Because the inventors did not have an appropriate blended, non-redistributed resin for control purposes, they prepared three different redistributed resins having mean MFI values of 12.2, 12.8 and 13.4, respectively. The blended redistributed resins were intended to simulate shift in MFI which is typically experienced by a customer when the mean MFI of a non-redistributed resin drifts within a broad specification.

The experiments compared results obtained by running the redistributed resin having a mean MFI value of 12.8 three separate times, versus data collected by running the each of three different MFI resins one time. As expected, both the redistributed resin having a single MFI and the set of three resins had a mean MFI of 12.8, but the single MFI redistributed resin had an MFI standard deviation of 0.067, whereas, the set of three had an MFI standard deviation of 0.24.

Figure 4:
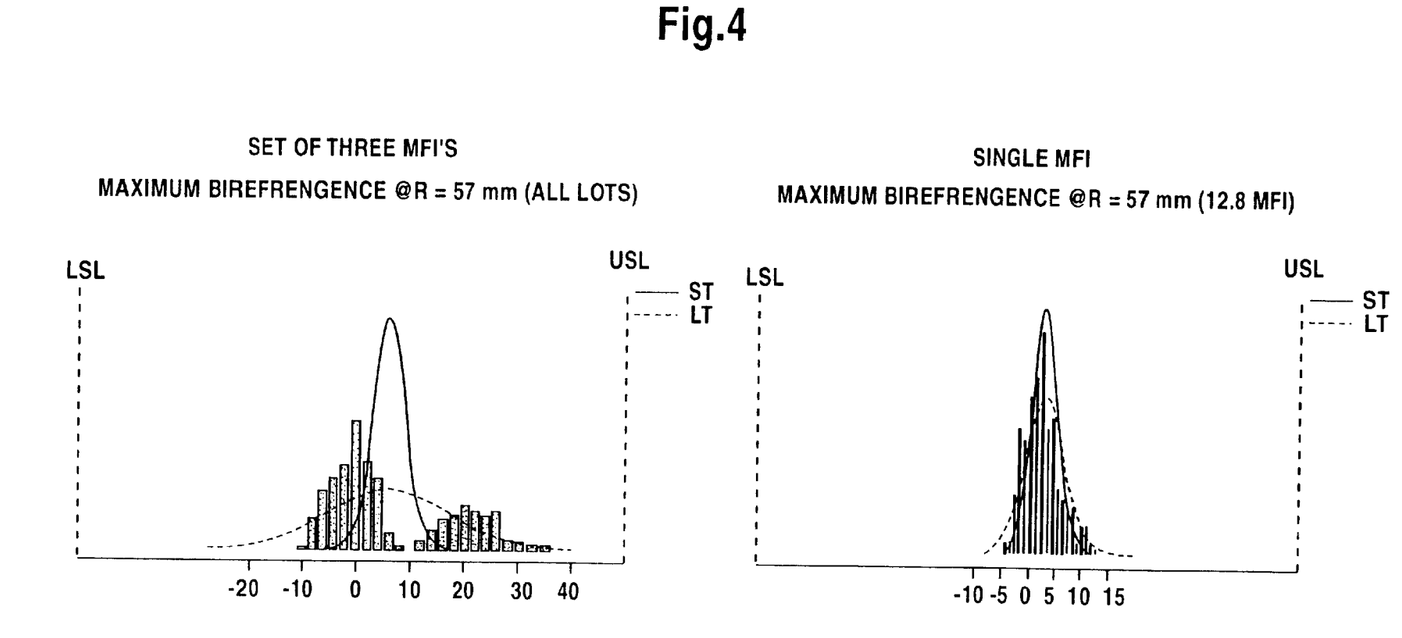
FIG. 4 is a comparative plot showing the distribution of maximum birefringence of compact discs injection molded from a collection of three different redistributed resins having mean MFI values of 12.2, 12.8 and 13.4 compared with a single redistributed resin having a mean MFI value of 12.8.

Maximum birefringence, peak injection pressure and cycle time variability were compared to determine the effect of mean MFI drift on a customer's processes. Numerical results corresponding to FIG. 4 and peak injection pressure and cycle time experiments are summarized in Table IV, below. FIG. 4 shows a histogram comparing maximum birefringence results obtained when measuring an optical disk blank 57 mm from its center using the set of three MFI resins in comparison with the single resin. FIG. 4 shows that variability for maximum birefringence is significantly reduced. This is important because high birefringence can lead to defective compact discs. Peak injection pressure and cycle time were also measured by sophisticated injection molding machines while molding optical discs (i.e., CD's).

TABLE IV

|  | FIG. 4 Max. biref. (nm) | Peak Injection Pressure | Cycle Time |
| --- | --- | --- | --- |
| Set of 3 MFI Resins | 28.93 s.d. = 3.22 | 835 s.d. = 35 | 3.92 s.d. = 0.18 |
| Single MFI Resin | 29.36 s.d. = 2.55 | 826 s.d. = 27 | 3.94 s.d.= 0.11 | s.d. = standard deviation
biref. = birefringence
max. = maximum

Table IV shows that for the critical parameters of maximum birefringence, peak injection pressure and cycle time, the redistributed resin according to the invention yields more consistent (lower standard deviation) performance.

Analysis of this data indicates that the MFI distribution of the polycarbonate resin has a significant impact on important properties of optical discs and the process of making optical discs. Specifically, redistributed resin prepared by the process described herein narrows the distribution of birefringence in optical discs, and narrows the peak injection pressure and cycle time variability of the optical discs manufacturing process. These properties are very important for resin customers because each of them is subject to tight specifications. Outliers produce defects, and concurrent loss of time and money in a repetitive injection molding operation. This experiment proves that reducing variability in the resin by the method described herein will save the customer (e.g., the optical disc manufacturer) money due to reduced defects and down time.

Example 4
Extended Run of Preferred Formulation

Polycarbonate resin (300,000 lbs.) was prepared as described in Example I and delivered to a silo. The resin was then drawn out of the silo to a bulk hopper and concentrate hopper. The concentrate hopper was charged with 2000 ppm glycerol monostearate and 2000 ppm bis(2,4-dicumylphenyl)pentaerithritol diphosphite and blended. The bulk and concentrate material was dropped to a 92 mm diameter Werner & Pfleiderer twin screw extruder line at a 9:1 ratio, respectively. The TBPH (20–100 ppm) catalyst was added via peristaltic pump to the feed throat. The TBPH pump speed was controlled using the system shown in FIG. 1. However, the later half of the extruder was equipped with a liquid injection port at which point was added 5 ppm of phosphoric acid quenching agent. Immediately after the acid injection, a vacuum section of the extruder removed the water and other volatiles. Following the vacuum section, the molten plastic was forced through a 10 um melt filter pack and die into the water bath. The strands were pulled through the water bath, pelletized, and packaged using normal procedures. The resulting resin exhibited a melt flow standard deviation of 0.13, which was significantly reduced from a standard deviation of 0.39, which was typically achieved without using a redistribution catalyst.

Example 5
Full Production Data

Figure 5:
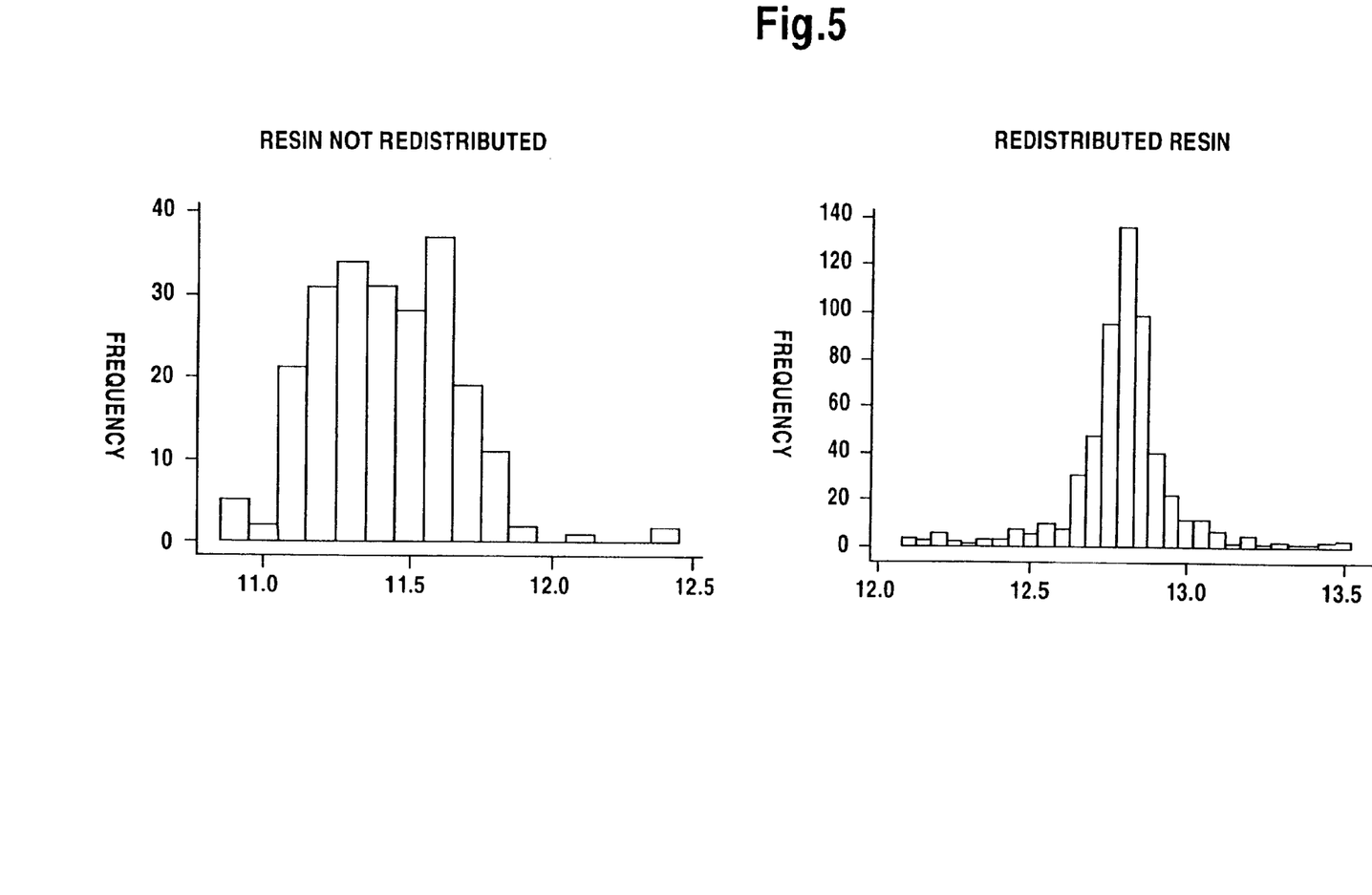
FIG. 5 is a comparative plot showing the MFI distribution of a control resin versus the MFI distribution of a redistributed resin. The data for both distribution plots was collected over a three-month period.

Data were collected from three months of plant production data over multiple extrusion lines using a redistribution method versus lines not using a redistribution method. The results, which are presented in FIG. 5, show that the MFI distribution is substantially narrowed for redistributed resins.

While the invention has been described with reference to certain preferred embodiments, it is understood by those skilled in this field that various changes may be made and equivalents may be substituted without departing from the spirit and scope of this invention. As examples, the skilled artisan would realize that different stabilizers (e.g., phosphite stabilizers) and mold release agents could be used. Also, the resin fed into the extruder could be pellets, a powder or even perhaps in molten form. Different catalysts could be used and various different control loop configurations, measurement schemes and result effective variables may be employed. Therefore, it is intended that the invention not be limited to the particular embodiments described herein, but that the invention will include all embodiments and variations falling within the scope of the appended general claims.

What is claimed is:

1. A method for producing a redistributed polycarbonate having a narrowed MFI distribution, which method comprises feeding into an extruder a source polycarbonate resin together with a redistribution catalyst for said polycarbonate resin, while using a feedback loop control mechanism for the extruder to adjust a result effective parameter, thereby producing said redistributed resin which has a melt flow distribution narrower than that of said source resin, wherein the redistribution catalyst produces a redistributed resin having lowered levels of free monomer.

2. The method of claim 1, wherein the result effective parameter is selected from the group consisting of the feeding rate of the redistribution catalyst, the temperature of the extruder, the operation speed of the extruder, the feeding rate of a co-reactant, the feeding rate of a quenching agent, the feeding ratio of the redistribution catalyst and combinations thereof.

3. The method of claim 2, wherein the result effective parameter is the feeding rate of the redistribution catalyst.

4. The method according to claim 3, wherein the redistribution catalyst is selected from the group consisting of tetraorganophosphonium hydroxides, tetraorganophosphonium carboxylates, tetraalkylammonium hydroxides, tetraalkylammonium acetates, phosphites, organometallic compounds, and combinations thereof.

5. The method according to claim 4, wherein the redistribution catalyst has an activity ratio of less than 25 molecular weight units per ppm catalyst, wherein the activity ratio is determined over a range of catalyst addition ratios sufficient to produce a percentage molecular weight drop of between 0 to 25%.

6. The method according to claim 2, wherein the result effective parameter is the operation speed of the extruder.

7. The method according to claim 5 or 6, wherein the redistribution catalyst is a tetra-($C_1$ alkyl) phosphonium hydroxide.

8. The method according to claim 1, wherein an additive is also fed into the extruder.

9. The method according to claim 8, wherein the additive is selected from the group consisting of dyes, pigments, stabilizers, plasticizers, mold release agents, anti-static agents and combinations thereof.

10. The method according to claim 8, wherein the extruder has a feed throat; and the additive, the polycarbonate resin, and the redistribution catalyst are added to the feed throat.

11. The method according to claim 8, wherein a quencher is added to the extruder at a point upstream of where the additive is added to the extruder.

12. The method according to claim 8, wherein the additive is a stabilizer.

13. The method according to claim 12, wherein the stabilizer is bis(2-4-dicumylphenyl) pentaerythritol diphosphite.

14. The method according to claim 9, wherein the additive is a mold release agent.

15. The method according to claim 14, wherein the mold release agent is glycerol monostearate.

16. The method according to claim 9, wherein the additive comprises bis(2,4-dicumylphenyl)pentaerythritol diphosphite and glycerol monostearate.

17. The method according to claim 1, which further comprises adding a quencher for the redistribution catalyst into the extruder at a position downstream of the point where the redistribution catalyst is added.

18. The method according to claim 17, wherein the quencher is an acid.

19. The method according to claim 18, wherein the quencher is $H_3PO_3$.

20. The method according to claim 7, wherein the polycarbonate resin has less than 200 parts per million diaryl carbonate impurities.

21. The method according to claim 1, wherein the feedback loop control mechanism comprises a sensor to measure the temperature of the resin within the extruder.

22. The method according to claim 1, wherein the feedback loop control mechanism comprises a sensor to measure the viscosity of the resin within the extruder.

23. The method according to claim 21, wherein the feedback loop control mechanism comprises a sensor to measure the viscosity of the resin within the extruder.

24. The method according to claim 1, wherein the redistributed polycarbonate resin has a standard deviation of MFI of less than 0.30 when measured over a period of eight hours collecting at least 15 data points at equally spaced time intervals.

25. The method according to claim 24, wherein the redistributed polycarbonate resin has a standard deviation of MFI of less than 0.15.

26. The method for producing a redistributed polycarbonate resin according to claim 1, which method further comprises: comparing said viscosity with a set point viscosity to determine a viscosity differential; and adjusting the result effective parameter based on the viscosity differential.

27. The method for producing a redistributed polycarbonate resin according to claim 1, which method further comprises measuring the temperature of the resin within the extruder; comparing the resin temperature with a set point to determine a temperature differential, and adjusting the result effective parameter based on the temperature differential.

28. The method for producing a redistributed polycarbonate resin according to claim 1, which method further comprises: measuring the temperature within the extruder; comparing the temperature set point with the measured temperature to determine a temperature differential, adjusting the result effective parameter based on a measurement variable selected from the group consisting of the temperature differential, the viscosity differential, and the combination of both the temperature differential and the viscosity differential.

29. A method for producing a redistributed polycarbonate having a narrowed MFI distribution, which method comprises feeding into an extruder a source polycarbonate resin together with a redistribution catalyst for said polycarbonate resin, while using a feedback loop control mechanism for the extruder to adjust a result effective parameter, thereby producing said redistributed resin which has a melt flow distribution narrower than that of said source resin, wherein the redistribution catalyst has an activity ratio of less than 25 molecular weight units per ppm catalyst, wherein the activity ratio is determined over a range of catalyst addition ratios sufficient to produce a percentage molecular weight drop of between 0 to 25%.

30. The method of claim 29, wherein the result effective parameter is selected from the group consisting of the feeding rate of the redistribution catalyst, the temperature of the extruder, the operation speed of the extruder, the feeding rate of a co-reactant, the feeding rate of a quenching agent, the feeding ratio of the redistribution catalyst, and combinations thereof.

31. The method of claim 30, wherein the result effective parameter is the feeding rate of the redistribution catalyst.

32. The method according to claim 31, wherein the redistribution catalyst is selected from the group consisting of tetraorganophosphonium hydroxides, tetraorganophosphonium carboxylates, tetraalkylammonium hydroxides, tetraalkylammonium acetates, phosphites, organometallic compounds, and combinations thereof.

33. The method according to claim 31, wherein the redistribution catalyst is a tetra-($C_{1-6}$ alkyl) phosphonium hydroxide.

34. The method according to claim 29, wherein an additive is also fed into the extruder.

35. The method according to claim 34, wherein the additive is selected from the group consisting of dyes, pigments, stabilizers, plasticizers, mold release agents, antistatic agents and combinations thereof.

36. The method according to claim 34, wherein the extruder has a feed throat; and the additive, the polycarbonate resin, and the redistribution catalyst are added to the feed throat.

37. The method according to claim 34, wherein a quencher is added to the extruder at a point upstream of where the additive is added to the extruder.

38. The method according to claim 34, wherein the additive is a stabilizer.

39. The method according to claim 38, wherein the stabilizer is bis(2-4-dicumylphenyl) pentaerythritol diphosphite.

40. The method according to claim 35, wherein the additive is a mold release agent.

41. The method according to claim 40, wherein the mold release agent is glycerol monostearate.

42. The method according to claim 35, wherein the additive comprises bis(2,4-dicumylphenyl)pentaerythritol diphosphite and glycerol monostearate.

43. The method according to claim 29, which further comprises adding a quencher for the redistribution catalyst into the extruder at a position downstream of the point where the redistribution catalyst is added.

44. The method according to claim 43, wherein the quencher is an acid.

45. The method according to claim 44, wherein the quencher is $H_3PO_3$.

46. The method according to claim 33, wherein the polycarbonate resin has less than 200 parts per million diaryl carbonate impurities.

47. The method according to claim 29, wherein the feedback loop control mechanism comprises a sensor to measure the temperature of the resin within the extruder.

48. The method according to claim 29, wherein the feedback loop control mechanism comprises a sensor to measure the viscosity of the resin within the extruder.

49. The method according to claim 29, wherein the feedback loop control mechanism comprises a sensor to measure the viscosity of the resin within the extruder.

50. The method according to claim 29, wherein the redistributed polycarbonate resin has a standard deviation of MFI of less than 0.30 when measured over a period of 8 hours collecting at least 15 data points at equally spaced time intervals.

51. The method according to claim 50, wherein the redistributed polycarbonate resin has a standard deviation of MFI of less than 0.15.

52. The method for producing a redistributed polycarbonate resin according to claim 29, which method further comprises: comparing said viscosity with a set point viscosity to determine a viscosity differential; and adjusting the result effective parameter based on the viscosity differential.

53. The method for producing a redistributed polycarbonate resin according to claim 29, which method further comprises measuring the temperature of the resin within the extruder; comparing the resin temperature with a set point to determine a temperature differential, and adjusting the result effective parameter based on the temperature differential.

54. The method for producing a redistributed polycarbonate resin according to claim 29, which method further comprises: measuring the temperate within the extruder; comparing the temperature set point with the measured temperature to determine a temperature differential, adjusting the result effective parameter based on a measurement variable selected from the group consisting of the temperature differential, the viscosity differential, and the combination of both the temperature differential and the viscosity differential.

55. A method for producing a redistributed resin having a narrow MFI distribution which comprises extruding a polycarbonate source resin together with a redistribution catalyst for said resin while using a feedback loop control mechanism to adjust addition of said redistribution catalyst, wherein the redistribution catalyst produces a redistributed resin having lowered levels of free monomer; and wherein the redistribution catalyst has an activity ratio of less than 25 molecular weight units per ppm catalyst, wherein the activity ratio is determined over a range of catalyst addition ratios sufficient to produce a percentage molecular weight drop of between 0 to 25%.

56. A method for producing a redistributed thermoplastic resin which comprises feeding a resin and a redistribution catalyst for said resin into an extruder, measuring the current melt temperature, comparing said melt temperature with a set point melt temperature to determine a temperature differential, and adjusting the feeding rate of the redistribution catalyst in response to said temperature differential, wherein the redistribution catalyst produces a redistributed resin having lowered levels of free monomer; and wherein the redistribution catalyst has an activity ratio of less than 25 molecular weight units per ppm catalyst, wherein the activity ratio is determined over a range of catalyst addition ratios sufficient to produce a percentage molecular weight drop of between 0 to 25%.

57. The method according to claim 56, which further comprises measuring the viscosity, comparing said viscosity with a set point viscosity to determine a viscosity differential, and adjusting the set point melt temperature in response to said viscosity differential.

58. A resin produced by the process according to claim 1.

59. A resin produced by the process according to claim 29.

60. An optical media device which comprises a resin produced by the process according to claim 1.

61. An optical media device which comprises a resin produced by the process according to claim 29.

62. A method for reducing the cycle time variability in compact disk molding which comprises injection molding compact disks using a resin produced by the process according to claim 1.

63. A method for reducing the cycle time variability in compact disk molding which comprises injection molding compact disks using a resin produced by the process according to claim 29.

64. A method of injection molding which comprises injection molding a thermoplastic resin prepared by the method according to claim 1.

65. A method of injection molding which comprises injection molding a thermoplastic resin prepared by the method according to claim 29.

66. A method for minimizing off-specification polycarbonate produced by a polycarbonate plant, which method comprises producing a master grade of polycarbonate resin at a manufacturing facility, transporting said master grade to a redistribution facility, and redistributing said polycarbonate, wherein said redistribution is accomplished by extruding the master grade polycarbonate resin together with a redistribution catalyst for said resin while using a feedback loop control mechanism to adjust addition of said redistribution catalyst, thereby producing a redistributed resin having a melt flow distribution narrower than that of said source resin.

67. A redistributed polycarbonate resin having a standard deviation of MFI of less than 0.30 when measured over a period of 8 hours collecting at least 15 data points at equally spaced time intervals.

68. The redistributed polycarbonate resin according to claim 67, having a standard deviation of less than 0.15.

69. The redistributed polycarbonate resin according to claim 67, wherein the polycarbonate resin has less than 200 parts per million diaryl carbonate impurities.

* * * * *